UNITED STATES PATENT OFFICE.

JOSÈ LLETGET Y SARDÀ, OF BARCELONA, SPAIN.

PROCESS OF MANUFACTURING IRON OR STEEL.

SPECIFICATION forming part of Letters Patent No. 324,790, dated August 18, 1885.

Application filed May 11, 1885. (No specimens.) Patented in England January 13, 1885, No. 479.

*To all whom it may concern:*

Be it known that I, JOSÈ LLETGET Y SARDÀ, chemist, a subject of the King of Spain, and a resident of Barcelona, in the Kingdom of Spain, but at present residing at 188 and 189 Gresham House, Old Broad street, in the city of London, England, have invented certain new and useful Improvements in the Manufacture or Treatment of Iron and Steel, (for which I have applied for a patent in Great Britain, No. 479, on the 13th of January, 1885,) of which the following is a specification.

The principal object of my invention is to effect the purifying, refining, hardening, or tempering of steel, so as to convert steel of a comparative low quality into steel of a higher quality; but it is also applicable to the treatment of iron.

According to my invention I take the metal to be treated in the form of ingots, pigs, or bars, and I heat it until it attains a high temperature, and then I plunge the metal when in this heated state into a bath composed of water and nitric acid and soda, using by preference carbonate of soda, the ingredients being employed in the proportions hereinafter stated, or thereabout. The temperature to which the metal should be heated will vary in accordance with the size of the mass or pieces to be treated. For example, a mass, say a foot square, should be heated to a white heat, while a strip, say an inch thick, should be heated to a high red heat. My improved process of treatment is applicable to iron and steel in large masses, and does not require the metal operated upon to be disintegrated or granulated. It is, in fact, efficient when applied to iron or steel in large or small masses. After the temperature of the metal has been lowered to the extent of losing its white or red color I find it advantageous in some cases to equalize the temperature of the bath by adding thereto sulphuric ether or ammoniacal salt, or the equivalent thereof; but I prefer to use a water-jacketed bath, the current of water through the jacket equalizing the temperature of the bath.

In order that my invention may be properly understood, I will more particularly describe the manner in which the same may be carried into effect.

The metal that is to be treated is heated in a furnace, or converted to a degree of heat varying with the size of the mass or particles treated, as was hereinbefore mentioned. The heated metal is quickly introduced into a bath of the hereinbefore-mentioned ingredients contained in a receptacle of clay, brick, or the like, with walls or sides, say, about one and one-half inch thick. In operating on a large scale these walls or sides should be surrounded externally by a casing or jacket through which passes a current of cold water, in order to prevent them from becoming overheated and to maintain a uniform temperature in the bath contained in the receptacle. I have ascertained that by increasing or diminishing the proportion of soda used in forming the bath a steel of more or less hardness will be produced.

The following average example may be given to serve as a rule for making the bath for operating with good effect, but the differences of the composition and structure of iron and steel will, as will be well understood by persons acquainted with the manufacture of iron or steel, render it necessary to somewhat vary the proportions of the ingredients that should be used for composing the bath so as to suit the kind of metal to be treated and to produce the quality of iron or steel required:

The quantity of water employed for the bath should be about six liters (say ten pints) for a kilogram (two thousand two hundred and five pounds avoirdupois) weight of metal to be treated. For example, for tempering an ingot, sheet-bar, or the like, weighing one kilogram, (two thousand two hundred and five pounds avoirdupois,) at least six liters (say ten pints) of water are required. The nitric acid should be used in the proportion of one part of acid to twelve parts of water as a minimum and two parts acid to twelve parts of water as a maximum. The proportion of the carbonate of soda to acid should be from one to four of acid as a minimum and equal parts as a maximum, it being borne in mind, as above stated, that by diminishing the proportion of soda to the acid the steel produced is made less hard or more mild.

The metal should remain in the bath until cool, and be suspended and moved therein in order to enable the bath to act effectually upon the metal. The metal is then removed and treated in any desired or ordinary way by the processes of remelting or reheating and rolling or the like.

By the treatment hereinbefore described the purification, refining, and hardening, and consequently the general improvement of the metal, may be conveniently, economically, and successfully effected.

I find that a bath composed of nitric acid and water and carbonate of soda in about the proportions indicated will give the best results; but it is obvious to chemists that in some cases, for the purpose of effecting the object as above stated, my process may be somewhat varied by using agents known to act chemically in an equivalent manner to those which I have specified. I would wish it, however, to be understood that not every saline solution is the equivalent of the described solution of nitric acid and soda and therefore within the limits of this invention, but only those which produce substantially the same results in substantially the same way. I may also observe that a variety of saline solutions have heretofore been used (or their use proposed) for tempering. Thus, for example, it has been proposed to use a solution, in six gallons of soft water, of carbonate of potash, saltpeter, and sea or rock salt, each three pounds, for tempering mill-picks and other steel tools. The following have also been proposed, namely: For files and other articles of steel, a solution, in water, of salt sufficient to give a strength of twenty-two degrees, to which has been added saltpeter, six pounds, and slaked lime, one pound, for each thirty gallons of water; for cast-iron plows, a solution of common salt, twelve pounds; saltpeter, four and one-half ounces; nitric acid, two ounces; muriatic acid, one and one-half ounce; salt-water, four gallons; super-carbonate of soda, three and three-fourths ounces; sal-ammoniac, two and one-half ounce, and sulphuric acid, one and one-quarter ounce; and for steel which has been previously heated to a cherry-red, coated with salt, and reheated, a solution, in one gallon of water, of niter, one-half ounce; alum, one and one-half ounce, and salt, four ounces. These (old) methods of treating iron and steel are of course not within the invention.

I claim—

1. The improved method or process of treating iron or steel by immersing it when heated in a bath of nitric acid and soda combined with water in about the proportions hereinbefore defined, and substantially in the manner hereinbefore set forth.

2. The improvement in the manufacture of iron and steel consisting in heating the same in masses to a red or white heat, immersing in a bath of nitric acid and soda mixed with water in about the proportions defined, and then subjecting said masses to the operations of reheating or remelting and rolling or the like, substantially as described.

In testimony whereof I have signed my name to this specification in the presence of two subscribing witnesses.

JOSÉ LLETGET Y SARDÀ.

Witnesses:
    EDWD. GEO. DAVIES,
      47 *Lincoln's Inn Fields, London, W. C.*
    CHAS. JAS. JONES,
      47 *Lincoln's Inn Fields, London.*